United States Patent [19]
Steinberger et al.

[11] Patent Number: 5,744,175
[45] Date of Patent: Apr. 28, 1998

[54] DEVICE FOR EXPANDING ROTATIONALLY SYMMETRICAL SHAPED PARTS

[75] Inventors: Wolfgang Steinberger, Herzogenaurach; Leo Muntnich, Aurachtal; Horst Lingner, Herzogenaurach, all of Germany

[73] Assignee: INA Walzlager Schaeffler KG, Germany

[21] Appl. No.: 676,317

[22] PCT Filed: Jan. 13, 1995

[86] PCT No.: PCT/EP95/00121

§ 371 Date: Jul. 12, 1996

§ 102(e) Date: Jul. 12, 1996

[87] PCT Pub. No.: WO95/22420

PCT Pub. Date: Aug. 24, 1995

[30] Foreign Application Priority Data

Feb. 18, 1994 [DE] Germany .................. 9402710 U

[51] Int. Cl.[6] .................................................. B21D 53/16
[52] U.S. Cl. .................. 425/390; 425/389; 425/392; 72/478; 72/352; 72/360
[58] Field of Search ..................... 425/389, 390, 425/392, 393, 406; 72/478, 352, 353.4, 353.6, 354.2, 360, 361

[56] References Cited

U.S. PATENT DOCUMENTS

| 2,088,265 | 7/1937 | Hulin et al. ................... 72/478 |
| 2,305,803 | 12/1942 | Bayer ............................. 72/478 |
| 2,689,539 | 9/1954 | Lyon .............................. 72/478 |
| 3,732,836 | 5/1973 | Molloy et al. . | |
| 3,983,739 | 10/1976 | Randolph ....................... 72/478 |
| 4,723,430 | 2/1988 | Hahn ............................. 72/478 |
| 4,984,445 | 1/1991 | Ohuchi et al. .................. 72/478 |

FOREIGN PATENT DOCUMENTS

| 3241249 | 5/1984 | Germany . |
| 856977 | 12/1960 | United Kingdom . |

*Primary Examiner*—Khanh P. Nguyen
*Attorney, Agent, or Firm*—Bierman, Muserlian and Lucas LLP

[57] ABSTRACT

A device for expanding rotationally symmetrical shaped parts (16), including a divided expanding mold (1), a pressure die (11) and a pressurizing means (14), wherein a mold cavity (9) of the expanding mold (1) is defined in axial directions by continuous end faces (20,21) of two spaced annular molds (17,18) and in radial direction by an inner peripheral surface of two mold halves (2,3).

4 Claims, 3 Drawing Sheets

DEVICE FOR EXPANDING ROTATIONALLY SYMMETRICAL SHAPED PARTS

FIELD OF THE INVENTION

The invention concerns a device for expanding rotationally symmetrical shaped parts, particularly bearing cages, comprising a divided expanding mold, a pressure die and a pressurizing means.

STATE OF THE ART

An already known device of this type comprises a two-part expanding mold whose mold halves are pressed firmly against each other during the shaping process by a conical ring. A rubber ring used as a pressurizing means is pressed radially outwards by a longitudinally displaceable die so that the inserted sheet metal blank to be shaped is pressed by the rubber ring into the desired final shape. The two mold halves are then separated and the finished shaped part can be removed (Oehler, Kaiser: Schnitt-, Stanz- und Ziehwerkzeuge, Springer Verlag, Berlin, Heidelberg, New York 1973, Page 502).

The drawback of such a device is the two-piece configuration of its expanding mold. A misalignment of the two mold halves at the mold joint can lead to material accumulations in the part shaped therein and have a detrimental effect on its later operation. For example, in the case of bearing cages, this material accumulation could be in the form of a sharp-edged flash on the end faces and cause damage when the cage contacts the rims of a bearing ring. It is therefore necessary to remove such accumulations of material in an additional work step such as grinding so that the products in which such a shaped part is used become more expensive.

OBJECTS OF THE INVENTION

It is therefore an object of the invention to configure an expanding mold for bearing cages such that no accumulations of material occur at points of frictional contact.

SUMMARY OF THE INVENTION

The invention achieves this object by the fact that, measured with reference to an already expanded shaped part, a mold cavity of the expanding mold extends in axial directions at least as far as the regions of the end faces of the shaped part and is delimited axially by a continuous annular mold at each end while being defined in radial direction in the region of the peripheral surface of the shaped part by two mold halves.

This four-part configuration of the expanding mold assures that the mold cavity is uninterrupted in the functionally important contact regions of the shaped part, i.e. at the end faces of the rolling bearing cage so that there are no mold parting lines and therefore no undesired accumulation of material in these regions. Due to the two-part configuration of the expanding mold in the region of the peripheral surface of the rolling bearing cage, material accumulations occur only in this region where, however, they present no problem because in cages guided by rolling elements there is no contact between the outer raceway and the regions of material accumulations.

If the shaped part to be expanded presents different diameters at its peripheral surface, as is the case for example with M-shaped cages, according to an advantageous embodiment of the invention, the mold parting plane between the annular molds and the mold halves is arranged in the region of the smallest diameter of the peripheral surface of the shaped part. By this measure, any material accumulations are shifted towards the center of the rolling bearing cage and have no contact with the raceways even in the case of raceway-guided cages.

In a further development of the invention, the parting plane between the continuous annular molds and the mold halves extends vertically or inclined to the central axis of the expanding mold. In the first case, the manufacture of the four-part mold is facilitated while in the second case, the inclined configuration simplifies the assembly of the four parts into a whole.

The invention will now be described more closely with the help of some examples of embodiment.

DESCRIPTION OF THE PREFERRED EMBODIMENTS

Figure 5:
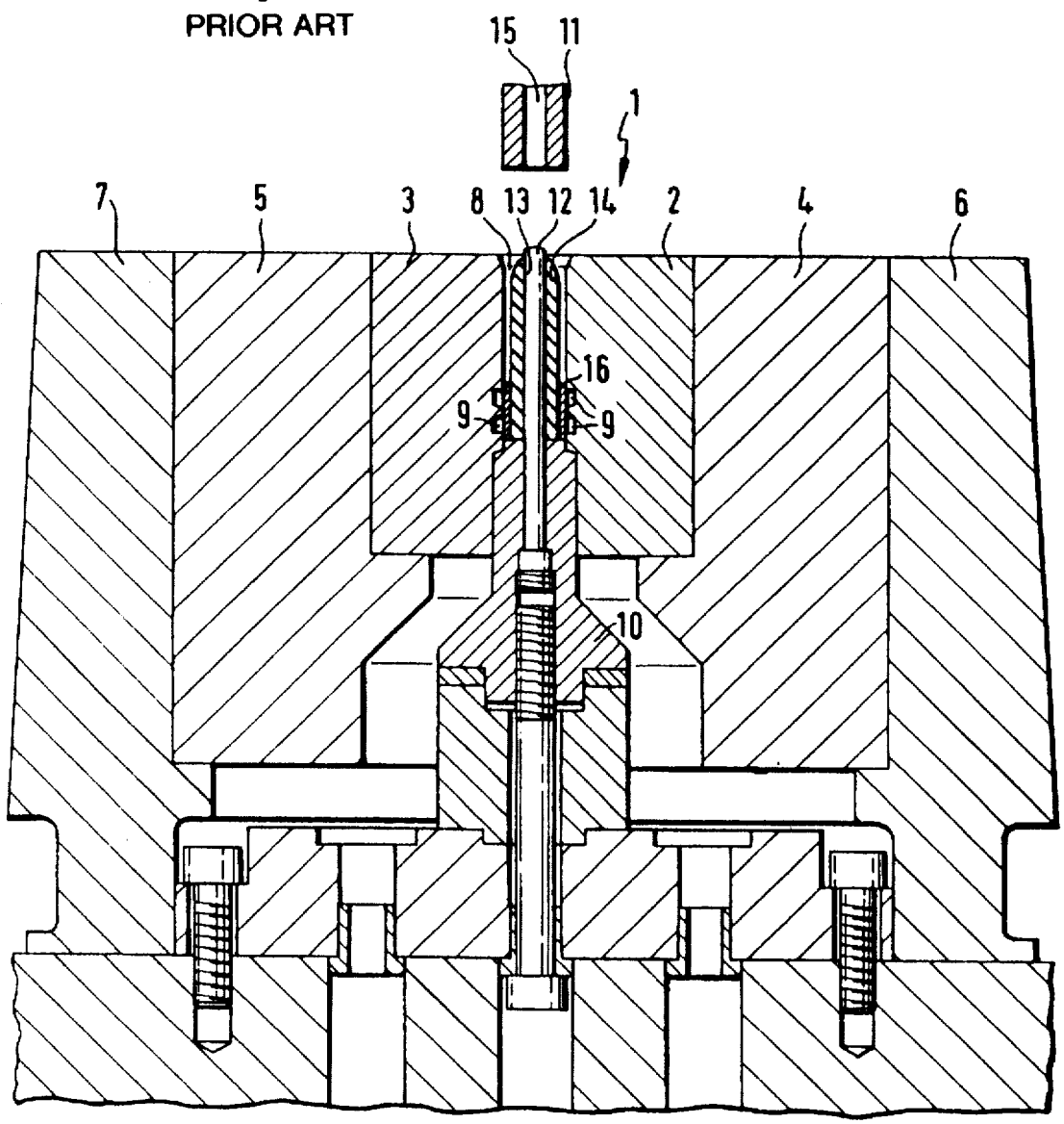
FIG. 5 is a longitudinal cross-section through a prior art device for expanding rotationally symmetrical shaped parts.

To elucidate the technical field of the invention, reference is first made to FIG. 5. The prior art device shown in this figure for expanding rotationally symmetrical shaped parts comprises a two-part expanding mold 1 having two mold halves 2 and 3. During the expanding procedure, these two mold halves 2 and 3 are pressed firmly against each other in radial direction by a bell-shaped tensioner, not shown, acting through the conical intermediate pieces 6, 7 and further through the intermediate pieces 4 and 5. At the center of the two mold halves 2 and 3 thus pressed together, there exists a bore 8 whose wall comprises a mold cavity 9. During the expanding process, a mating element 10 is inserted from one end into the bore 8. The mating element 10 carries a mandrel 12 on which a pressurizing means in the form of a rubber cylinder 14 comprising a hole 13 is arranged. A pressure die 11 having a bore 15 is inserted from the other end into the bore 8 so that the bore 15 of the pressure die 11 surrounds the mandrel 12 of the mating element 10. When the pressure die 11 and the mating element 10 are moved towards each other, the rubber cylinder 14 is compressed in axial direction so that, due to the constancy of its volume, it is forced to yield in radial direction. In doing so, it presses the shaped part 16 into the mold cavity 9. After the shaped part 16 has been expanded into its desired final shape, the mold halves 2 and 3 are separated in radial direction while the pressure die 11 and the mating element 10 are moved apart in axial direction so that the finished shaped part 19 can be retrieved. By reason of the aforementioned possible misalignment between the two mold halves 2 and 3, there exists the danger of material accumulation at the mold joint location.

Figure 1:
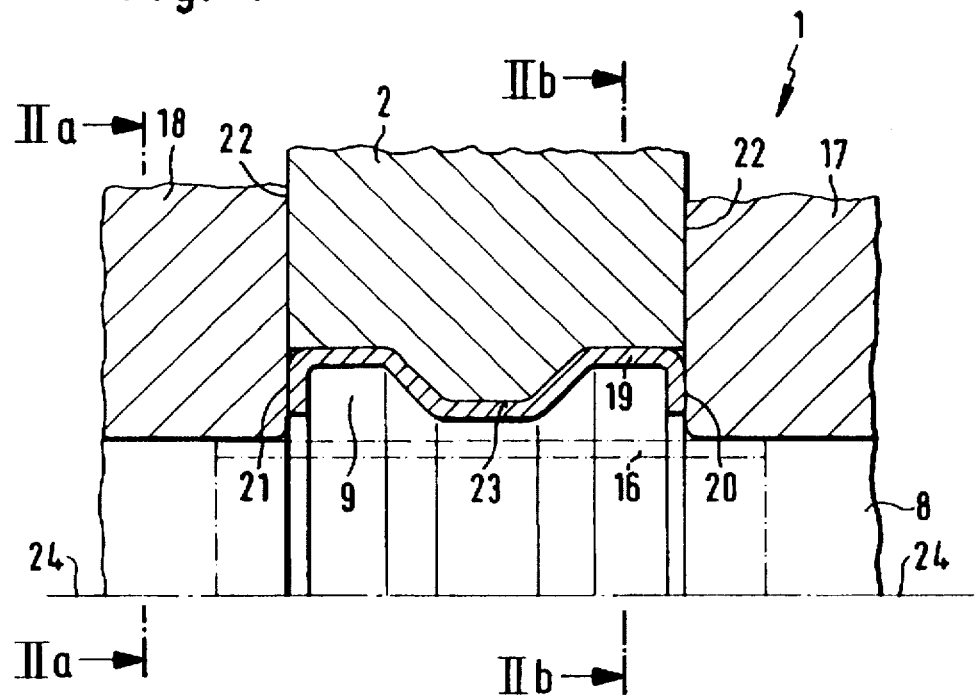
FIG. 1 is a partial longitudinal cross-section of a four-part expanding mold of the invention.
Figure 2A:
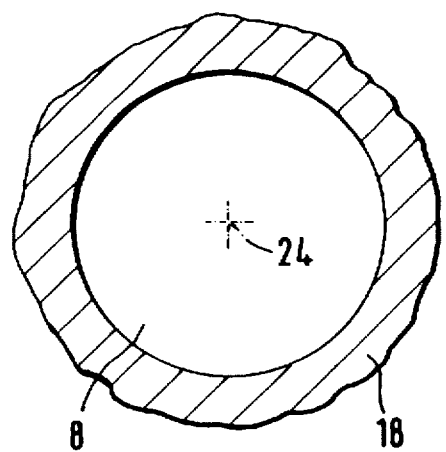
FIG. 2a is a cross-section taken along line IIa—IIa of FIG. 1.
Figure 2B:
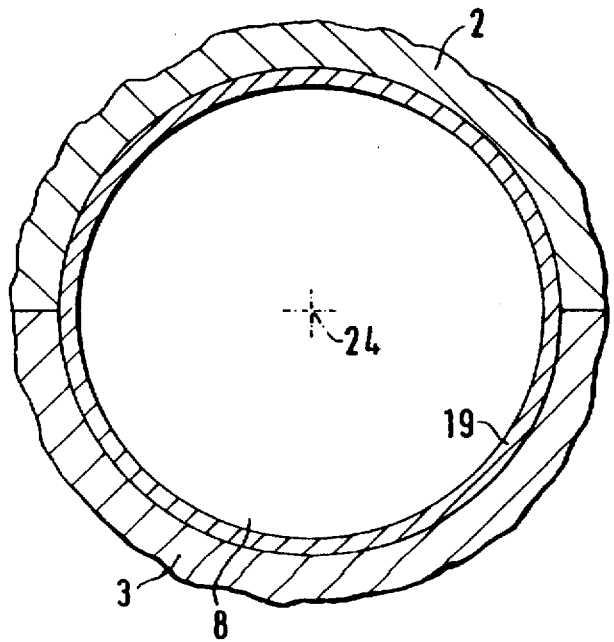
FIG. 2b is a cross-section taken along line IIb—IIb of FIG. 1.

The expanding mold 1 of the invention comprises, as depicted in FIGS. 1, 2a, 2b, two continuous annular molds 17 and 18 and two mold halves 2 and 3 arranged therebetween which means that the expanding mold 1 is made up of a total of four separate parts 2, 3, 17 and 18. As can be seen in FIG. 1, the mold cavity 9 is defined by the continuous end faces of the annular molds 17 and 18 and by the inner peripheral surfaces of the mold halves 2 and 3. The shaped part 19 is created by expanding the shaped part 16. Due to the continuous configuration of the annular molds 17 and 18, the end faces 20 and 21 of the shaped part 19 do not present any undesired material accumulations, that is to say, they possess a smooth surface. Due to the mold joint of the mold halves 2 and 3 it is, however, possible for material accumulations to occur on the peripheral surface 23 of the M-shaped part 19 but at this location they are of no importance because in rolling element-guided cages these material accumulations do not come into contact with the raceway of an outer bearing ring.

Figure 3:
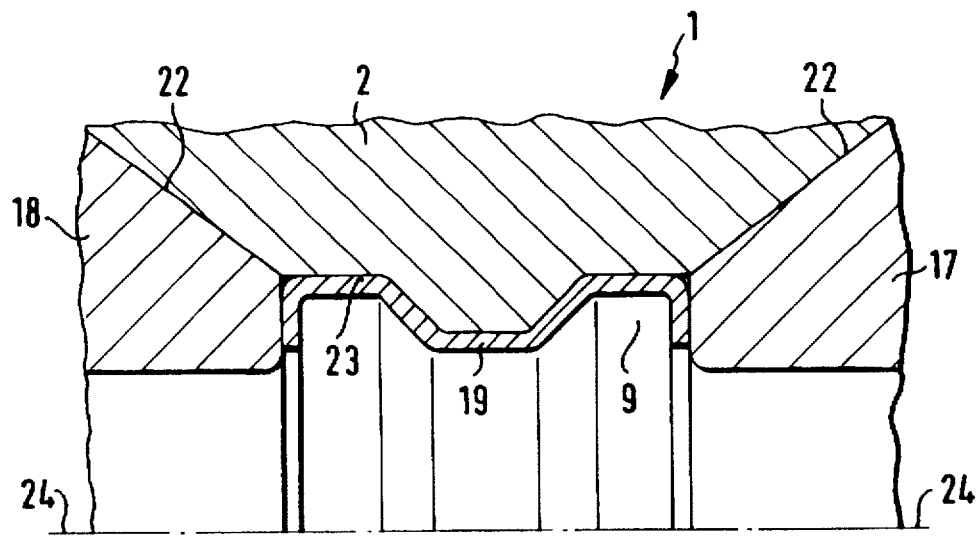
FIG. 3 is a partial longitudinal cross-section of an expanding mold of the invention having an inclined parting plane.

The expanding mold 1 of FIG. 3 is different in that the parting plane 22 between the annular molds 17 and 18 and the mold halves 2 and 3 is inclined with respect to a central axis 24 of the expanding mold 1. This facilitates assembly of the individual parts into a complete expanding mold 1 because the two mold halves 2 and 3 cannot be driven in radially beyond the contacting surfaces of the annular molds 17 and 18.

Figure 4:
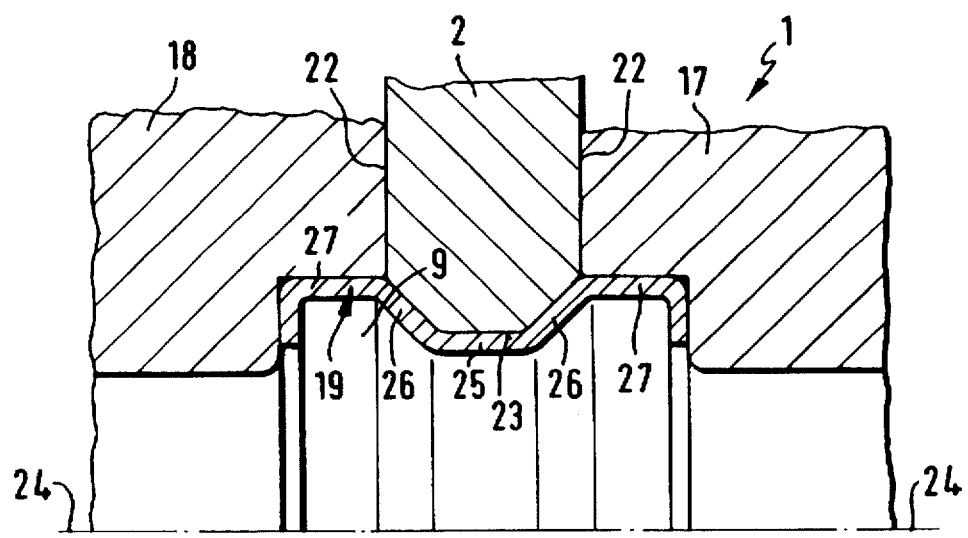
FIG. 4 is a partial longitudinal cross-section of an expanding mold of the invention having a vertical parting plan.

In contrast to FIG. 3, the parting plane 22 between the annular molds 17 and 18 and the mold halves 2 and 3 of the embodiment of FIG. 4 extends vertically of the central axis 24 and the mold joint between the mold halves 2 and 3 is situated in the region of the smallest diameter of the shaped part 19.

It is assured in this way that in an M-shaped part 19 which can be a double-bent cage, the material accumulations caused by the mold halves 2 and 3 occur in the region of a central section 25 and of two inclined intermediate sections 26 so that these material accumulations do not come into contact with the raceway of the outer ring even in raceway-guided cages. The only parts that contact the raceway of the outer ring are the outer sections 27 and these do not comprise any material accumulations caused by mold joints.

We claim:

1. A device for expanding rotationally symmetrical shaped parts (16), comprising a divided expanding mold (1), a pressure die (11) and a pressurizing means (14) for pressing the shaped part into a mold cavity, wherein the mold cavity (9) of the expanding mold (1) is defined in axial directions by continuous end faces (20,21) of two spaced annular molds (17,18) and in radial direction by an inner peripheral surface of two mold halves (2,3).

2. A device of claim 1 wherein a mold parting place (22) between the annular molds (17,18) and the mold halves (2,3) extends vertically or is inclined to a central axis (24) of the expanding mold (1).

3. A device of claim 1 wherein a point of separation between the two mold halves (2,3) is situated in a region of smallest diameter of the mold cavity (9).

4. A device of claim 2 wherein a point of separation between the two mold halves (2,3) is situated in a region of smallest diameter of the mold cavity (9).

* * * * *